US012129630B2

(12) United States Patent
Ishii (10) Patent No.: US 12,129,630 B2
(45) Date of Patent: Oct. 29, 2024

(54) INSTALLATION STRUCTURE OF ELECTRIC COMPONENT AND HYDRAULIC HOSE FOR WORKING MACHINE

(71) Applicant: Yanmar Power Technology Co., Ltd., Osaka (JP)

(72) Inventor: Hisayuki Ishii, Chikugo (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 995 days.

(21) Appl. No.: 16/973,360

(22) PCT Filed: Apr. 4, 2019

(86) PCT No.: PCT/JP2019/014959
§ 371 (c)(1),
(2) Date: Dec. 8, 2020

(87) PCT Pub. No.: WO2019/244440
PCT Pub. Date: Dec. 6, 2019

(65) Prior Publication Data
US 2021/0254311 A1    Aug. 19, 2021

(30) Foreign Application Priority Data

Jun. 19, 2018 (JP) ................................. 2018-116211

(51) Int. Cl.
*E02F 9/22* (2006.01)
*B60R 16/02* (2006.01)
(Continued)

(52) U.S. Cl.
CPC ............ *E02F 9/2275* (2013.01); *B60R 16/02* (2013.01); *B60R 16/08* (2013.01); *E02F 3/3695* (2013.01);
(Continued)

(58) Field of Classification Search
CPC ......... E02F 9/2275; E02F 3/382; E02F 3/384; E02F 9/0858; E02F 9/2285; F16L 3/26; F16L 3/18; F16L 3/20
(Continued)

(56) References Cited

U.S. PATENT DOCUMENTS 5,082,217 A    1/1992 Parker et al.
9,719,233 B1 *  8/2017 Abe ..................... E02F 9/2275
(Continued)

FOREIGN PATENT DOCUMENTS

EP    2975182 A1    1/2016
JP    7-190253 A    7/1995
(Continued)

OTHER PUBLICATIONS

International Search Report dated Jul. 2, 2019 issued in corresponding PCT Application PCT/JP2019/014959.
(Continued)

*Primary Examiner* — Christopher Garft
(74) *Attorney, Agent, or Firm* — NORTON ROSE FULBRIGHT US LLP (57) ABSTRACT

The present invention is provided with: a plate provided while one surface is directed toward the machine body structure of a working machine; a first support and a second support, which are raised from the one surface of the plate and which affix the plate to the machine body structure; a hydraulic hose which is routed on and along the one surface of the plate; and an electric component mounted on the one surface of the plate. The one surface of the plate has a hydraulic hose arrangement section where the hydraulic hose is arranged between the first support and the second support, and an electric component mounting section where the electric component is mounted so as to be adjacent to the hydraulic hose arrangement section.

17 Claims, 8 Drawing Sheets

(51) Int. Cl.
 *B60R 16/08* (2006.01)
 *E02F 3/36* (2006.01)
 *E02F 3/38* (2006.01)
 *E02F 9/08* (2006.01)
 *F16L 3/26* (2006.01)

(52) U.S. Cl.
 CPC .............. *E02F 3/382* (2013.01); *E02F 3/384* (2013.01); *E02F 9/0858* (2013.01); *F16L 3/26* (2013.01); *E02F 9/2285* (2013.01)

(58) Field of Classification Search
 USPC .......................................................... 248/75
 See application file for complete search history.

(56) References Cited

U.S. PATENT DOCUMENTS

| | | | | |
|---|---|---|---|---|
| 2013/0115036 A1* | 5/2013 | Yamato | ................. | E02F 9/2275 414/687 |
| 2014/0241841 A1 | 8/2014 | Veloso et al. | | |
| 2015/0115659 A1* | 4/2015 | Kurushima | ........... | E02F 9/2275 296/190.08 |
| 2016/0114837 A1* | 4/2016 | Iwahashi | ............... | E02F 9/0858 296/190.08 |

FOREIGN PATENT DOCUMENTS

| | | |
|---|---|---|
| JP | 2007-063876 A | 3/2007 |
| JP | 2010-038275 A | 2/2010 |
| JP | 2013121871 A | 6/2013 |
| JP | 2016-169529 A | 9/2016 |
| WO | 2017217917 A1 | 12/2017 |

OTHER PUBLICATIONS

European Search Report dated Feb. 16, 2022 issued in EP Application 19823422.1.

* cited by examiner

| | SWITCH POSITION | | |
|---|---|---|---|
| | OFF | ON 1 | ON 2 |
| SWITCH SW1 | DE-ENERGI-ZATION | ENERGIZATION | ENERGIZATION |
| SWITCH SW2 | DE-ENERGI-ZATION | DE-ENERGI-ZATION | ENERGIZATION |
| FIRST LIGHTING DEVICE 45 | OFF | ON | ON |
| SECOND LIGHTING DEVICE 33 | OFF | OFF | ON |

FIG. 9

INSTALLATION STRUCTURE OF ELECTRIC COMPONENT AND HYDRAULIC HOSE FOR WORKING MACHINE

CROSS REFERENCES TO RELATED APPLICATIONS

This application is a national stage application pursuant to 35 U.S.C. § 371 of International Application No. PCT/JP2019/014959, filed on Apr. 4, 2019 which claims priority under 35 U.S.C. § 119 to Japanese Patent Application No. 2018-116211 filed on Jun. 19, 2018, the disclosures of which are hereby incorporated by reference in their entireties.

TECHNICAL FIELD

The present invention relates to an installation structure of an electric component and a hydraulic hose for a working machine.

BACKGROUND ART

In a working machine such as a hydraulic excavator, it is desirable that both an electric component and a hydraulic hose are efficiently disposed in a mounting space of a machine body structure without interfering with each other. In particular, in a small working machine with a small machine body size (for example, a compact excavator), there is not enough space for installing parts such as electric components, and therefore there is a strong request for a method capable of efficiently disposing both the electric component and the hydraulic hose in the limited mounting space.

Patent Literature 1 describes a structure in which a storage space is formed on the front side of a seat base that supports a driver's seat, and an electric component assembly is installed inside the storage space. The electric component assembly has an L-shaped mounting bracket composed of a front plate and a side plate, and various electric components are mounted on the front and back of the front plate. However, this structure does not consider arrangement of a hydraulic hose, and does not disclose any solution with respect to the above request.

Patent Literature 2 describes a fixture including a suspension plate suspended and fixed to a vehicle body frame and an erected plate erected on the suspension plate. This fixture is configured such that a hydraulic hose is arranged on the back side of the suspension plate, and an electric component is fixed to the erected plate. However, in this structure, the hydraulic hose is arranged along the suspension plate suspended on a pair of vehicle body frames. Therefore, there is a problem that this structure cannot be applied to a hydraulic hose that is arranged in the vertical direction.

CITATION LIST

Patent Literature

Patent Literature 1: Japanese Unexamined Patent Application Publication No. 2007-63876
Patent Literature 2: Japanese Unexamined Patent Application Publication No. 2013-121871

DISCLOSURE OF INVENTION

Problems to be Solved by the Invention

The present invention has been made in view of the above circumstances, and an object of the present invention is to provide an installation structure of an electric component and a hydraulic hose for a working machine, in which both an electric component and a hydraulic hose can be efficiently disposed in a mounting space of an machine body structure without interfering with each other.

Means for Solving the Problems

An installation structure of an electric component and a hydraulic hose for a working machine according to the present invention includes: a plate disposed on a machine body structure of a working machine so as to face one surface; a first support and a second support for fixing the plate to the machine body structure, the first support and the second support being erected on the one surface of the plate; a hydraulic hose that passes and is arranged on the one surface of the plate; and an electric component mounted on the one surface of the plate, wherein the one surface of the plate has a hydraulic hose arrangement section where the hydraulic hose is arranged between the first support and the second support, and an electric component mounting section where the electric component is mounted adjacent to the hydraulic hose arrangement section. With this configuration, both the electric component and the hydraulic hose can be efficiently disposed in a mounting space of the machine body structure without interfering with each other.

The hydraulic hose may be a hydraulic pilot hose arranged along a vertical direction, and the plate may be fixed to the machine body structure in an upright attitude. Consequently, the present invention is particularly useful for a small working machine such as a small compact excavator having a small mounting space.

The plate preferably includes a guide member mounted on the plate, wherein the guide member preferably has a base portion provided along the one surface of the plate and a bent portion that bends in a direction intersecting with the one surface of the plate to guide the hydraulic hose, and the bent portion is preferably disposed outside the one surface of the plate. The movement of the hydraulic hose is appropriately regulated by guiding using a guide member, and damage to the hydraulic hose can be prevented.

From the viewpoint of disposing the electric component more efficiently, an electric component different from the electric component mounted on the electric component mounting section is preferably mounted on the other surface side of the plate. It is preferable to provide a heat shield cover that covers the electric component mounted on the other surface side of the plate in order to protect the electric component from heat.

DESCRIPTION OF EMBODIMENTS

Figure 1:
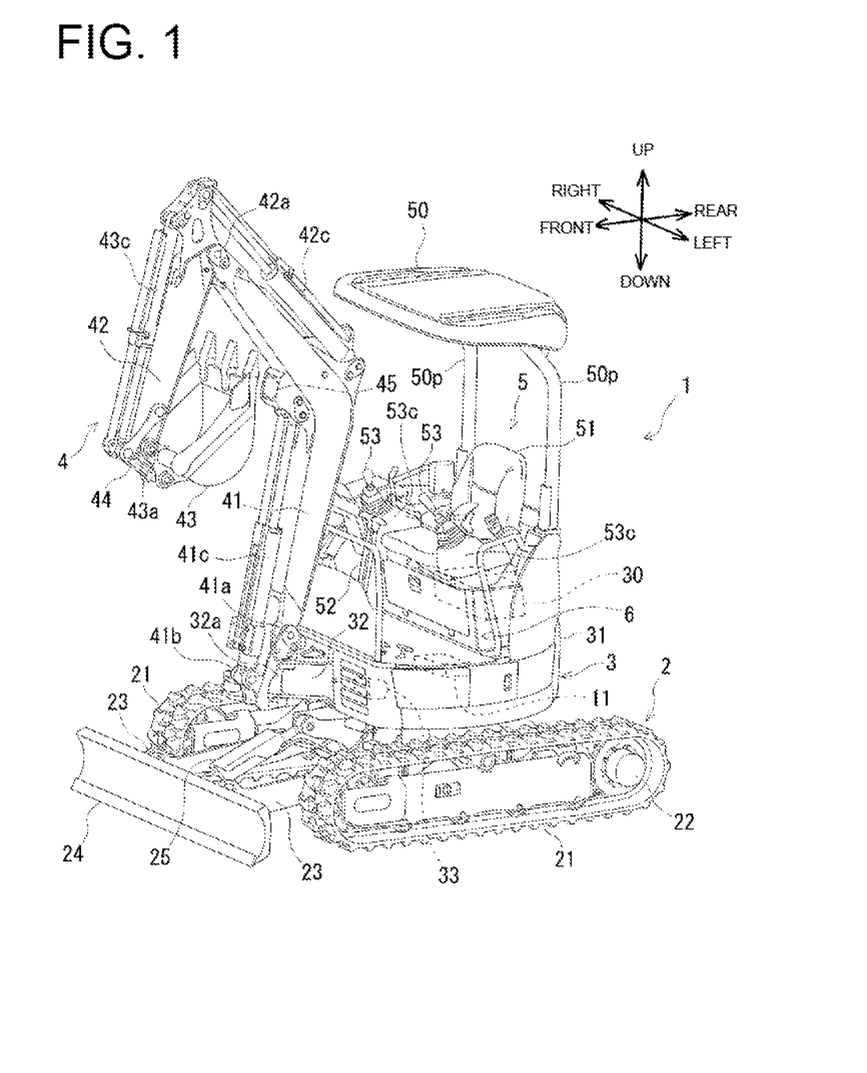
FIG. 1 is a perspective view illustrating a turning work vehicle as an example of a working machine.

An embodiment of the present invention will be described with reference to the drawings, by taking an example of a small rear turning type backhoe as a working machine. A turning work vehicle 1 illustrated in FIG. 1 is a working machine composed as a shovel (backhoe) with a boom swing function. In general, the boom swing function is mounted in a compact excavator (small hydraulic excavator) that requires workability in a narrow space. The turning work vehicle 1 includes a lower traveling body 2, an upper turning body 3, and a working machine 4.

The lower traveling body 2 is driven by receiving power from an engine 30 to cause the turning work vehicle 1 to travel or turn. The lower traveling body 2 includes a pair of left and right crawlers 21, 21 and respective traveling motors 22 that drive the crawlers 21, 21. The traveling motors 22 are each composed of a hydraulic motor. Further, in the lower traveling body 2, a pair of blade arms 23 and 23, a blade 24 as an earth-moving plate extending in the left-right direction between tips of the blade arms, and a blade cylinder 25 that is a hydraulic actuator for rotating the blade 24 vertically are provided.

The upper turning body 3 is provided above the lower traveling body 2 so as to be turnable. A turning base (not illustrated) that supports the upper turning body 3 in a turning manner is provided between the pair of crawlers 21, 21. A turning motor (not illustrated) that is a hydraulic motor turns the upper turning body 3 by driving the turning base. The upper turning body 3 is formed so as to be turnable in a substantially disk shape in plan view within the width of the lower traveling body 2 (an interval between an outer edge of the crawler 21 on the left side and an outer edge of the crawler 21 on the right side). In the upper turning body 3, the engine 30, a counter weight 31 and the like are disposed.

The working machine 4 is driven by receiving power from the engine 30 to perform excavation work of earth and sand according to operation of a control unit 5. The working machine 4 has a boom 41, an arm 42, a bucket 43 that is an attachment for excavation, and a hydraulic actuator (specifically, a boom cylinder 41c, an arm cylinder 42c, a bucket cylinder 43c, and a swing cylinder, which will be described below). The working machine 4 performs swing operation in conjunction with horizontal rotation of a boom bracket 41b described below, and moves horizontally relative to the upper turning body 3.

The boom 41 extends in the vertical direction from a base end supported by the boom bracket 41b, and bends in a boomerang shape in side view. The boom 41 is mounted on the boom bracket 41b so as to be vertically rotatable (rotatable forward and backward). The base end of the boom 41 is supported so as to be vertically rotatable around a pivot pin 41a. The boom cylinder 41c, that moves so as to freely expand and contract, is provided between the boom bracket 41b and a middle portion of the boom 41. The vertical rotation of the boom 41 with respect to the boom bracket 41b operates according to the expansion and contraction of the boom cylinder 41c.

The boom bracket 41b is mounted on a front end of the upper turning body 3 via a stay 32 so as to be rotatable horizontally (swing). The boom bracket 41b is supported so as to be horizontally rotatable around the pivot pin 32a provided on the stay 32. The swing cylinder (not illustrated) that expands and contracts in the front-rear direction is provided between the upper turning body 3 and the boom bracket 41b. The horizontal rotation of the boom bracket 41b operates according to the expansion and contraction of the swing cylinder.

The arm 42 is mounted on the boom 41 so as to be rotatable vertically (forward and backward). A base end of the arm 42 is supported so as to be vertically rotatable around the pivot pin 42a. The arm cylinder 42c, that moves so as to freely expand and contract, is provided between the middle portion of the boom 41 and the base end of the arm 42. The vertical rotation of the arm 42 with respect to the boom 41 operates according to the expansion and contraction of the arm cylinder 42c.

The bucket 43 is mounted on the arm 42 so as to be rotatable vertically. A base end of the bucket 43 is supported so as to be rotatable vertically (forward and backward) around the pivot pin 43a. A bucket link 44 that transmits driving force to the bucket 43 is interposed between a tip of the arm 42 and the bucket 43. The bucket cylinder 43c, that moves so as to freely expand and contract, is provided between the bucket 44 and the base end of the arm 42. The vertical rotation of the bucket 43 with respect to the arm 42 operates according to the expansion and contraction of the bucket cylinder 43c.

Hydraulic oil is supplied to the boom cylinder 41c, the arm cylinder 42c, the bucket cylinder 43c and the swing cylinder by a plurality of hydraulic pumps (not illustrated) driven by the engine 30. These hydraulic actuators are connected to a control valve device 11 via respective hydraulic pipelines (not illustrated), and pressure oil discharged from each hydraulic pump is supplied via the control valve device 11. The control valve device 11 is composed of a plurality of built-in control valves, and controls the hydraulic actuators such as the above cylinders, the traveling motors 22 of the lower traveling body 2, and the turning motor (not illustrated) for turning the upper turning body 3.

The control unit 5 is provided above the upper turning body 3. In the control unit 5, an operator seat 51 for allowing an operator to sit on, a traveling lever 52 located in front of the operator seat 51, a pair of work operation levers 53, 53 located on the left and right sides of the operator seat 51, and the like are installed. The operator operates the traveling lever 52, the work operation levers 53, and the like while sitting on the operator seat 51, so that the operator can control the engine 30 and each hydraulic motor, and each hydraulic actuator, and can travel, turn, and operate the working machine 4.

In this embodiment, a canopy 50 that covers the control unit 5 from above is provided. The canopy 50 is supported by a pair of vertically extending pillars 50p, 50p behind the operator seat 51. The control unit 5 is not limited to the configuration in which such a canopy 50 is provided, and may have a specification in which the control unit 5 is entirely covered with a canopy.

Figure 2:
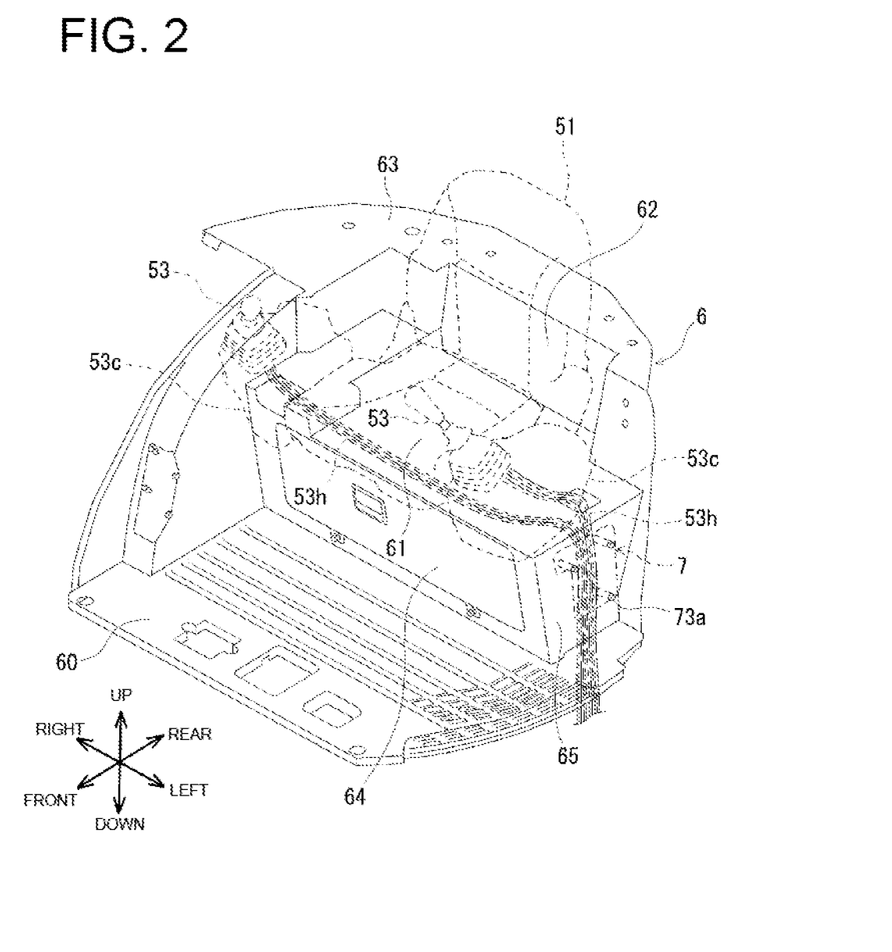
FIG. 2 is a perspective view illustrating a seat mount and a floor panel.

The operator seat 51 is supported by a seat mount 6 as a machine body structure as illustrated in FIG. 2. A floor panel 60 is laid in the lower front portion of the seat mount 6. The seat mount 6 is disposed above the engine 30 (see FIG. 1), and in a compact excavator (an example of a small construction machine) as in this embodiment, such a layout is common. A space below the seat mount 6 is used as a space (engine room) for housing the engine 30 and the hydraulic pumps, and effectively utilized as a mounting space for installing parts such as electric components.

The seat mount 6 includes an upper plate portion 61 on which the operator seat 51 is placed, a back plate portion 62 extending upward from a rear portion of the upper plate portion 61, and a rear plate portion 63 extending rearward from an upper portion of the back plate portion 62, a front plate portion 64 extending downward from a front portion of the upper plate portion 61, and a left plate portion 65 extending downward from a left edge of the upper plate portion 61 and extending rearward from a left edge of the front plate portion 64. The upper plate portion 61 is disposed above the engine 30, the front plate portion 64 is disposed in front of the engine 30, and the left plate portion 65 is disposed on the left side of the engine 30. The operator seat 51 is disposed in a central portion in the left-right direction of the upper plate 61, and the pair of work operation levers 53, 53 are disposed so as to sandwich the operator seat 51 therebetween.

Figure 3:
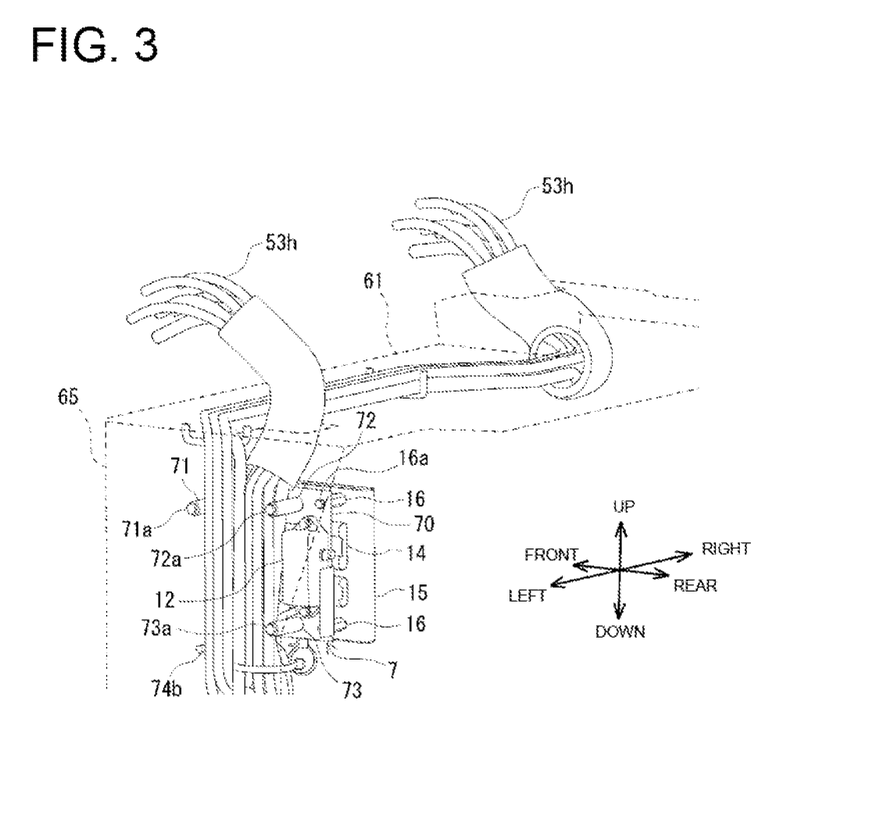
FIG. 3 is a perspective view of a hydraulic hose viewed from the left rear.

The pair of work operation levers 53, 53 are connected to hydraulic pilot valves (not illustrated) built in consoles 53c, 53c that support the respective work operation levers, and are connected to the control valve device 11 (see FIG. 1) via hydraulic hoses 53h, 53h. In this embodiment, the hydraulic hoses 53h, 53h are concentrated on one of the left and right sides and extended downward from the viewpoint of ensuring the assembling property of the machine body. More specifically, as illustrated in FIGS. 2 and 3, the hydraulic hose 53h connected to the work operation lever 53 on the right side is extended to the left side below the seat mount 6 (of the upper plate portion 61), and the hydraulic hose 53h connected to the work operation lever 53 on the left side is bundled and extended downward.

Figure 4:
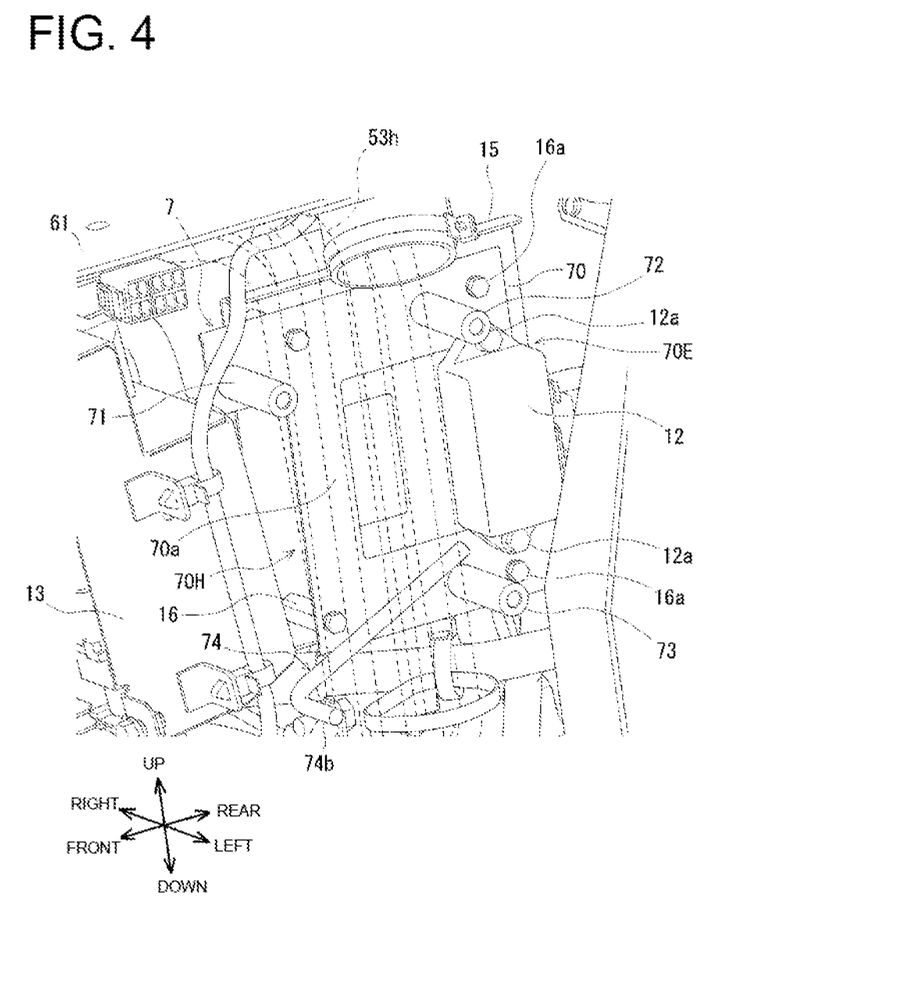
FIG. 4 is a diagram illustrating an electric component and hydraulic hoses installed in a mounting space.

In FIG. 4, the left plate portion 65 is removed such that an electric component 12 and the hydraulic hoses 53h installed in the mounting space below the seat mount 6 can be seen. The electric component 12 and the hydraulic hoses 53h are installed via a mounting member 7 illustrated in FIG. 5. This installation structure includes a plate 70 disposed on the seat mount 6 (of the left plate portion 65) as the machine body structure so as to face one surface 70a, a first support 71 and a second support 72 for fixing the plate 70 to the seat mount 6, the first support 71 and the second support 72 being erected on the one surface 70a of the plate 70, the hydraulic hoses 53h that pass and are arranged on the one surface 70a of the plate 70, and the electric component 12 mounted on the one surface 70a of the plate 70.

Figure 5:
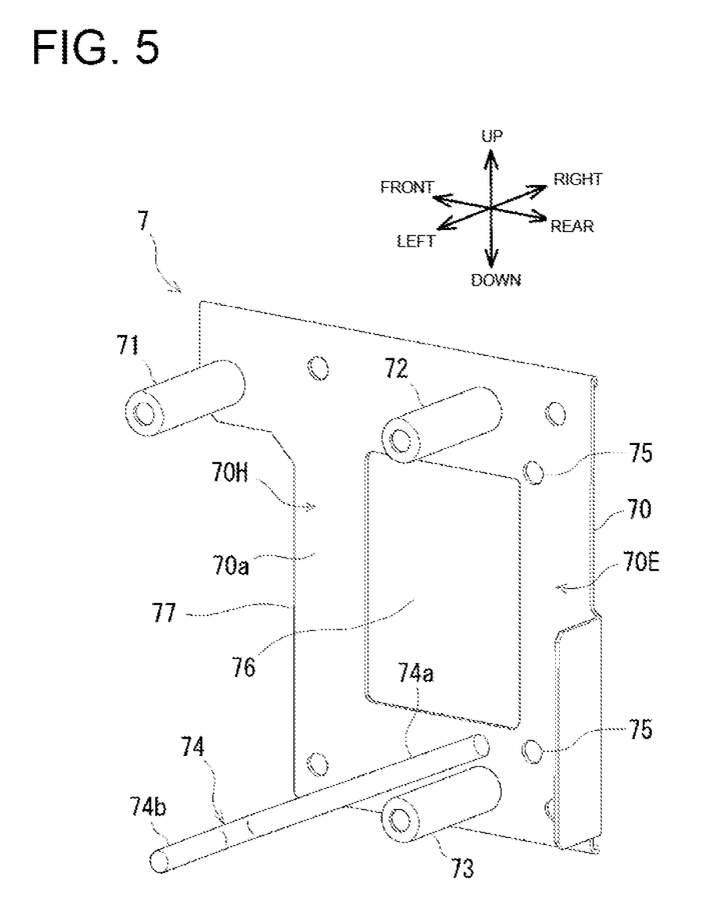
FIG. 5 is a perspective view of a mounting member as viewed from one surface side of a plate.

The one surface 70a of the plate 70 has a hydraulic hose arrangement section 70H where the hydraulic hoses 53h are arranged between the first support 71 and the second support 72, and an electric component mounting section 70E where the electric component 12 is mounted adjacent to the hydraulic hose arrangement section 70H. In this embodiment, the electric component mounting section 70E is provided behind the hydraulic hose arrangement section 70H so as to be adjacent to the hydraulic hose arrangement section 70H. The hydraulic hoses 53h are guided so as to be sandwiched between the first support 71 and the second support 72, while bundled between the one surface 70a of the plate 70 and the left plate portion 65. The electric component 12 is supported by the one surface 70a in such a region as not to interfere with the bundled hydraulic hoses 53h. According to this configuration, both the electric component 12 and the hydraulic hoses 53h can be efficiently disposed in the mounting space below the seat mount 6 without interfering with each other.

The first support 71 and the second support 72 are composed of high nuts (long nuts). The first support 71 and the second support 72 are mounted with bolts 71a and 72a, respectively, from the left plate portion 65 side, and mounted with bolts 71b and 72b (see FIG. 6), respectively, from the other surface 70b side of the plate 70, so that the plate 70 is fixed to the seat mount 6. The present invention is not limited to this, and a structure in which the first support 71 or the second support 72 is composed of a bolt (for example, a stud bolt) and fixing is performed by tightening of nuts from both sides may be used. The plate 70 is formed with holes 75, 75 into which bolts 12a as fixtures for fixing the electric component 12 are inserted.

The hydraulic hoses 53h are hydraulic pilot hoses arranged along the vertical direction, and the plate 70 is fixed to the seat mount 6 in an upright attitude. Consequently, not only the electric component 12 but also the hydraulic pilot hoses arranged from the upper side to the lower side can be efficiently disposed in the limited mounting space, which is therefore particularly useful for a small working vehicle (for example, a compact excavator as in this embodiment). However, the present invention is not limited to this. The mounting attitude of the plate 70 with respect to the machine body structure is appropriately selected, so that hydraulic hoses arranged in the horizontal direction can be handled. That is, even when hydraulic hoses are arranged in any of the horizontal direction and the vertical direction, efficient arrangement is possible.

In the plate 70 in the upright attitude, the first support 71 and the second support 72 are erected on an upper portion of the one surface 70a, and a third support 73 is erected on a lower portion of the one surface 70a. The third support 73 is configured in the same manner as the first support 71 and the second support 72, and a bolt 73a is mounted from the left plate portion 65 side, and a bolt 73b is mounted from the other surface 70b side. The second support 72 and the third support 73 are disposed so as to sandwich a lightening hole 76 formed at a central portion of the plate 70. Below the first support 71, a cutout 77 is formed on a front side edge of the plate 70, and is configured so as to avoid interference with a housing 13 housing a fuse and the like (see FIG. 4).

The installation structure in this embodiment includes a guide member 74 mounted on the plate 70 as illustrated in FIGS. 3 to 5. The guide member 74 has a base portion 74a provided along the one surface 70a of the plate 70, and a bent portion 74b that bends in the direction intersecting with the one surface 70a of the plate 70 to guide the hydraulic hoses 53h. The bent portion 74b is not located on the one surface 70a, that is, is disposed outside the one surface 70a. By using such a guide member 74, the movement of the hydraulic hoses 53h can be appropriately regulated, and damage to the hydraulic hoses 53h can be prevented. In this embodiment, the guide member 74 is formed of an L-shaped round bar member. However, the guide member 74 is not limited to this, and may be formed of, for example, an L-shaped plate member.

The bent portion 74b is disposed at a lower portion of the one surface 70a, and the bundled hydraulic hoses 53h are sandwiched between the third support 73 and the bent portion 74b and are guided. Therefore, while the hydraulic hoses 53h are disposed between the one surface 70a of the plate 70 and the left plate portion 65, the hydraulic hoses 53h are guided at four locations of the first support 71, the second support 72, the third support 73, and (the bent portion 74b of) the guide member 74. Although a support cannot be erected below the first support 71 because the cutout 77 is formed, the hydraulic hoses 53h are accurately guided by using such a guide member 74, so that the hydraulic hoses 53h can be precisely installed. The guide member 74 is fixed to the one surface 70a by, for example, welding.

Figure 6:
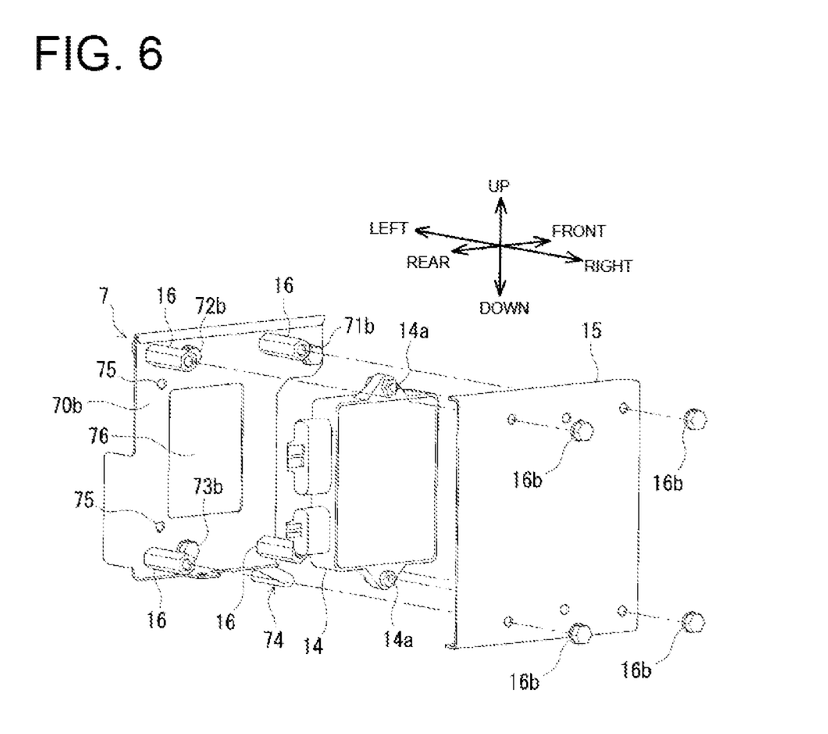
FIG. 6 is an exploded perspective view of the mounting member as viewed from the other surface side of the plate.

As illustrated in FIG. 6, in this embodiment, an electric component 14 different from the electric component 12 is mounted on the electric component mounting section 70E on the other surface 70b side of the plate 70 such that the electric components can be arranged more efficiently. This installation structure includes a heat shield cover 15 that covers the electric component 14 mounted on the other surface 70b side of the plate 70. Consequently, the electric components 12 and 14 can be protected from heat in the mounting space (especially heat dissipation from the engine 30), and performance deterioration or damage of the electric components can be prevented. As far as the material of the heat shield cover 15 can sufficiently protect the electric components from heat, the material is not particularly limited.

The electric component 14 is disposed between the plate 70 and the heat shield cover 15 and is mounted on the other surface 70b side (inside in the width direction of the machine body) of the plate 70. The electric component 14 is mounted on the heat shield cover 15 via bolts 14a, but may be mounted the other surface 70b of the plate 70. On the other surface 70b of the plate 70, a plurality of (four in this embodiment) supports 16 for fixing the heat shield cover 15 to the plate 70 are erected. Each of the plurality of supports 16 is composed of a high nut, is mounted with a bolt 16a from the one surface 70a side (see FIGS. 3 and 4), and is mounted with a bolt 16b from the opposite side, so that the heat shield cover 15 is mounted on the plate 70.

As illustrated in FIG. 1, the turning work vehicle 1 includes a first lighting device 45 disposed near a bent portion of the boom 41, and a second lighting device 33 disposed in front of a lower portion of the upper turning body 3. These are working lights that use LEDs as light sources, and are lighted during night work. The first lighting device 45 functions as a boom lamp for lighting the bucket 43, and the second lighting device 33 functions as a work lamp for lighting a construction site. An LED lamp has high brightness and excellent directivity, but on the other hand, a worker working near the turning work vehicle 1 may be temporarily blinded by light of the second lighting device 33, or may feel stressed by the light.

Figure 7:
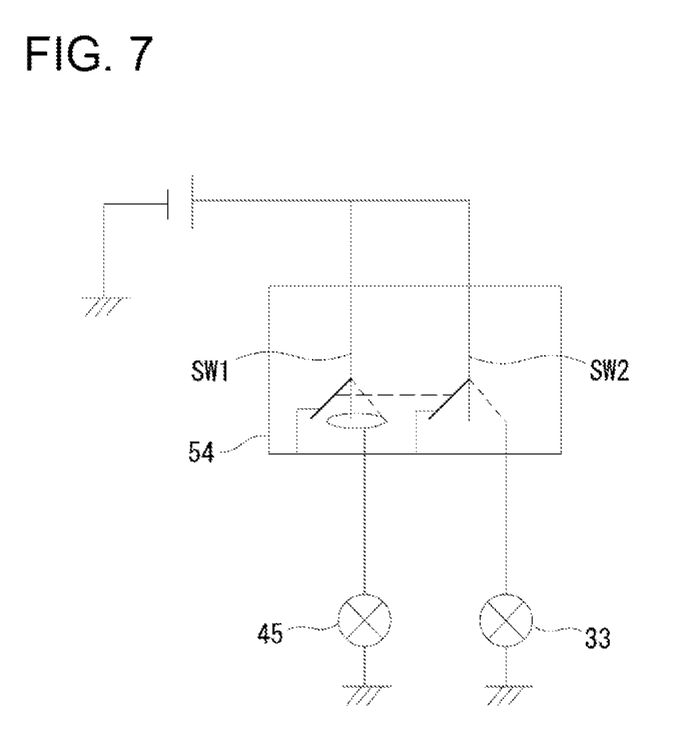
FIG. 7 is a circuit diagram illustrating a schematic configuration of a lighting switch.

Therefore, this turning work vehicle 1 includes a lighting switch 54 as illustrated in FIG. 7. The lighting switch 54 is installed in the control unit 5. The lighting switch 54 is configured to be switchable among a first state in which the first lighting device 45 and the second lighting device 33 are turned on at the same time, a second state in which the first lighting device 45 is turned on and the second lighting device 33 is not turned on, and a third state in which the first lighting device 45 and the second lighting device 33 are turned off at the same time. Therefore, in a situation where a worker may be temporarily blinded by the light of the second lighting device 33, it is possible to perform work safely by switching to the second state.

Figure 8:
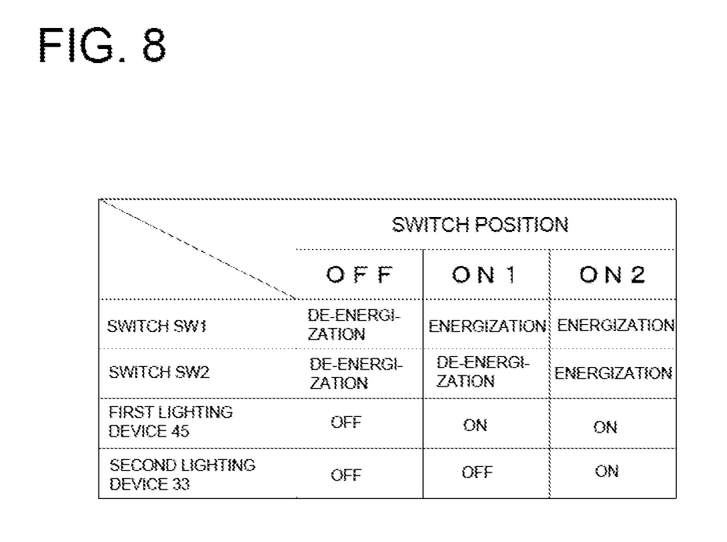
FIG. 8 is a table illustrating the relationship between a switch position of the lighting switch and a lighting state of each lighting device.

A table in FIG. 8 illustrates the relationship between a switch position of the lighting switch 54 and the lighting state of the first lighting device 45 and the second lighting device 33. When the switch position of the lighting switch 54 is set to "OFF", both a switch SW1 and a switch SW2 are de-energized, and the first lighting device 45 and the second lighting device 33 are turned off (third state). When the switch position is set to "ON1", while the switch SW1 is energized, the switch SW2 is de-energized, only the first lighting device 45 is turned on, and the second lighting device 33 is turned off (second state). When the switch position is set to "ON2", both the switch SW1 and the switch SW2 are energized, and the first lighting device 45 and the second lighting device 33 are turned on (first state).

Figure 9:
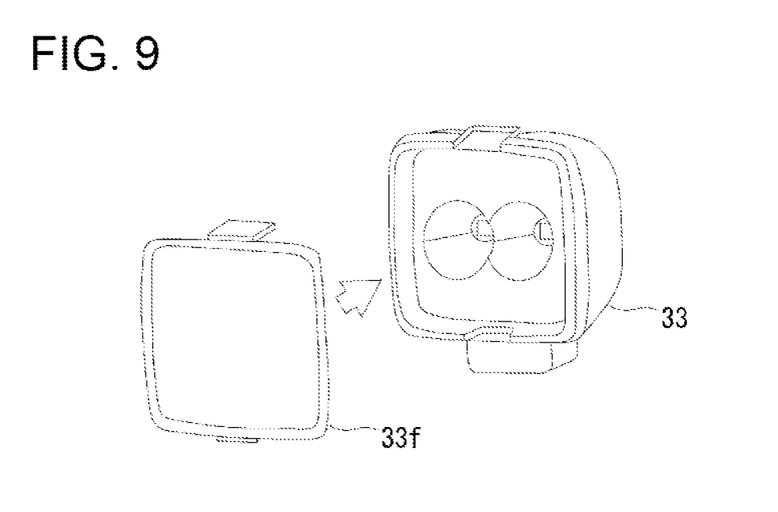
FIG. 9 is a perspective view illustrating a second lighting device and a dimming filter.

In this embodiment, as illustrated in FIG. 9, a dimming filter 33f that is detachably mounted on the second lighting device 33 is provided. The dimming filter 33f is formed of, for example, a lens cover colored in yellow, and is mounted so as to cover a front side of the second lighting device 33. In a situation in which light from the second lighting device 33 may be diffusely reflected to affect work of a worker, such as a snowy area with a lot of snow and a work environment with a lot of dust, a color temperature is adjusted and the amount of light is appropriately reduced by the dimming filter 33f, so that it is possible to enhance workability. The dimming filter 33f is preferably detachable without using a tool (that is, toolless).

In this embodiment, an example in which the turning work vehicle has a so-called boom swing function of swinging the working machine 4 left and right with respect to the upper turning body 3 is shown. However, the present invention is not limited to this. In this embodiment, an example in which the working machine is a turning work vehicle configured as a backhoe is shown. However, the present invention is not limited to this. For example, other construction machine such as an excavator and a wheel loader, or an industrial machine such as a forklift may be used.

The present invention is not limited to the embodiment described above, and various improvements and modifications can be made within the scope not departing from the spirit of the present invention.

DESCRIPTION OF REFERENCE NUMERALS 1 turning work vehicle
6 seat mount (an example of a machine body structure)
7 mounting member
12 electric component
14 electric component
15 heat shield cover
33 second lighting device
33f dimming filter
45 first lighting device
53h hydraulic hose
54 lighting switch
65 left mounting plate portion
70 plate
70a one surface
70b other surface
70E electric component mounting section
70H hydraulic hose arrangement section
71 first support
72 second support
73 third support
74 guide member
74a base portion
74b bent portion

The invention claimed is:
1. An installation structure of an electric component and a hydraulic hose for a working machine, the installation structure comprising:
a plate disposed on a machine body structure of the working machine such that one surface of the plate faces the machine body structure;

a first support and a second support for fixing the plate to the machine body structure, the first support and the second support being erected on the one surface of the plate;

the hydraulic hose that passes and is arranged on the one surface of the plate; and the electric component mounted on the one surface of the plate, wherein the one surface of the plate has a hydraulic hose arrangement section where the hydraulic hose is arranged between the first support and the second support, and an electric component mounting section where the electric component is mounted adjacent to the hydraulic hose arrangement section.

2. The installation structure according to claim 1, wherein the hydraulic hose is a hydraulic pilot hose arranged along a vertical direction, and the plate is fixed to the machine body structure in an upright attitude.

3. The installation structure according to claim 1, wherein the machine body structure is a seat mount that supports an operator seat.

4. The installation structure according to claim 1, comprising a guide member mounted on the plate, wherein the guide member has a base portion provided along the one surface of the plate and a bent portion that bends in a direction intersecting with the one surface of the plate to guide the hydraulic hose, and the bent portion is disposed outside the one surface of the plate.

5. The installation structure according to claim 4, wherein the first support and the second support are erected on an upper portion of the one surface of the plate in an upright attitude, a third support is erected on a lower portion of the one surface of the plate, and while the hydraulic hose is disposed between the one surface of the plate and the machine body structure, the hydraulic hose is guided at four locations of the first support, the second support, the third support, and the guide member.

6. The installation structure according to claim 4, wherein the guide member is formed of an L-shaped round bar member.

7. The installation structure according to claim 1, wherein an electric component different from the electric component mounted on the electric component mounting section is mounted on another surface side of the plate opposite the one surface.

8. The installation structure according to claim 7, comprising a heat shield cover that covers the electric component mounted on the other surface side of the plate.

9. The installation structure according to claim 8, wherein a plurality of supports for fixing the heat shield cover to the plate are erected on the other surface of the plate.

10. The installation structure according to claim 1, wherein the plate is attached to a surface of the machine body structure such that the one surface of the plate faces the surface of the machine body structure.

11. An installation structure of first and second electric components and a hydraulic hose for a working machine, the installation structure comprising:

a plate disposed on a machine body structure of the working machine such that a first surface of the plate faces the machine body structure;

a first support and a second support for fixing the plate to the machine body structure, the first support and the second support each extending from the first surface of the plate;

the hydraulic hose that passes and is arranged on the first surface of the plate;

the first electric component mounted on the first surface of the plate; and the second electric component mounted on a second surface of the plate, wherein the second surface is opposite the first surface, wherein the first surface of the plate has a hydraulic hose arrangement section where the hydraulic hose is arranged between the first support and the second support, and an electric component mounting section where the first or second electric component is mounted adjacent to the hydraulic hose arrangement section.

12. The installation structure according to claim 11, wherein the plate is attached to a surface of the machine body structure such that the first surface of the plate faces the surface of the machine body structure.

13. A system comprising:

a plate attached to a surface of a structure of a working machine such that a surface of the plate faces the surface of the structure;

a first support extending from the surface of the plate and configured to attach the plate to the structure;

a second support extending from the surface of the plate and configured to attach the plate to the structure;

a hydraulic hose that is arranged on the surface of the plate between the first support and the second support; and an electric component mounted adjacent to the hydraulic hose on the surface of the plate.

14. The system of claim 13, further comprising a guide member extending from the plate, wherein the guide member includes a base portion extending along the surface of the plate and a bent portion extending at an angle to the base portion.

15. The system of claim 14, wherein the base portion and the bent portion from an L-shape.

16. The system of claim 14, further comprising a third support extending from the surface of the plate and configured to attach the plate to the structure.

17. The system of claim 16, wherein the hydraulic hose is further arranged between the third support and the bent portion of the guide member.

* * * * *